United States Patent Office 3,408,053
Patented Oct. 29, 1968

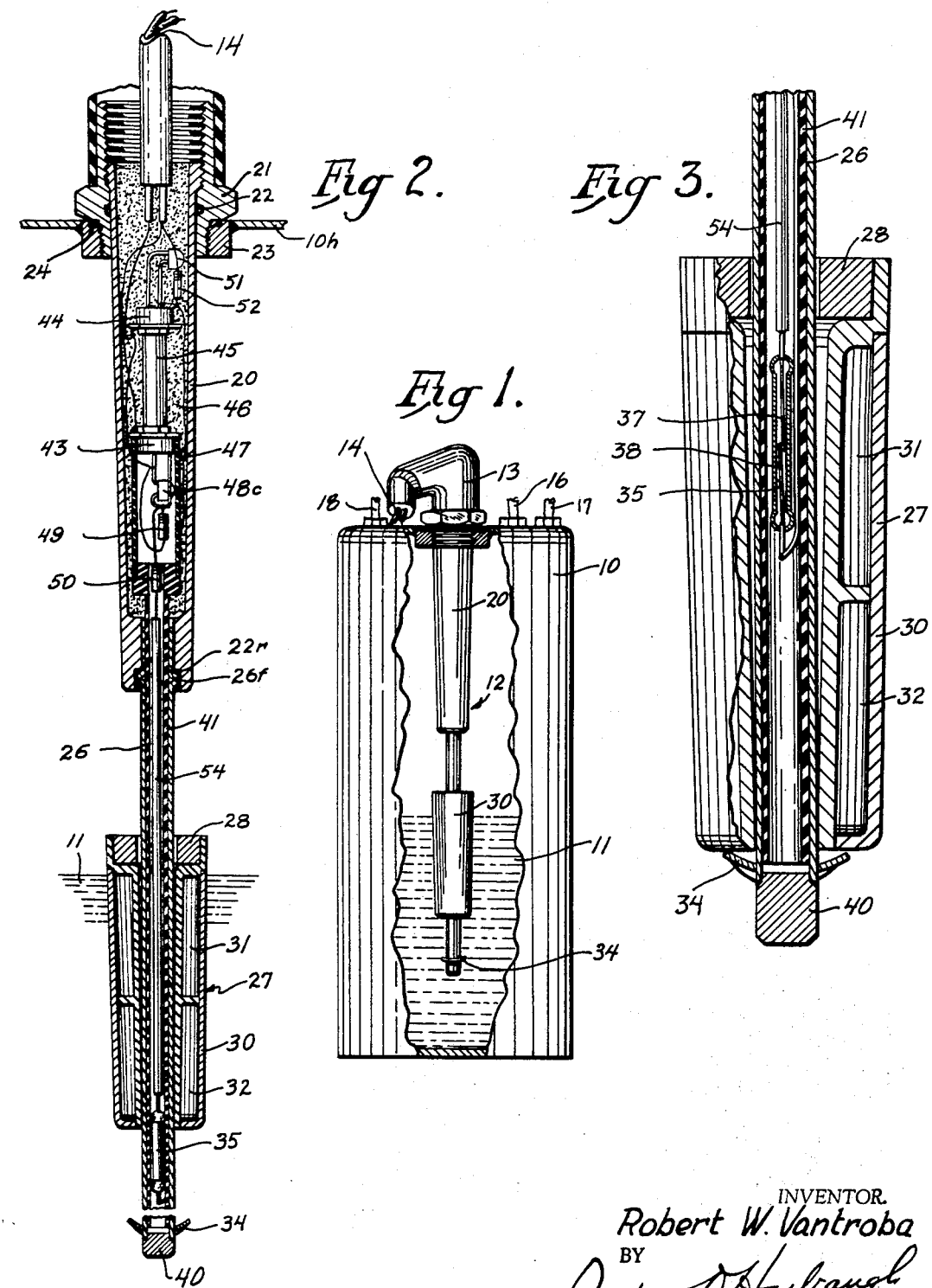

3,408,053
LIQUID LEVEL FLOAT CONTROL
Robert W. Vantroba, Glen Ellyn, Ill., assignor to The Bastian-Blessing Company, Chicago, Ill., a corporation of Illinois
Filed Oct. 19, 1965, Ser. No. 497,738
5 Claims. (Cl. 261—27)

ABSTRACT OF THE DISCLOSURE

Liquid level float controls particularly suited for use in tanks containing chemically active fluids. The controls are inserted in a carbonating tank used in soft-drink vending machines, and comprises a hollow sleeve incorporating an electronic motor control circuit, an elongated magnetically responsive element and a magnetically actuatable switch. A circular magnet mounted on a float surrounds the sleeve and is buoyed up and down along the sleeve as the liquid level changes. Because of the presence of the elongated magnetically responsive element, a latching effect is achieved which causes the switch to close when the magnet is near the bottom of the sleeve adjacent the switch but not to open until the tank is substantially filled and the magnet is near the top of the sleeve.

---

This application pertains to liquid level float switch apparatus. More particularly, it relates to apparatus of special utility in controlling the level of a carbonated liquid contained in a tank associated with liquid-vending devices.

It is desirable in many present-day liquid vending machines to include a replenishable tank in which a liquid, such as water, is carbonated particularly under refrigerated conditions. Apparatus for effectively controlling the level of the liquid within the tank is subject to deterioration by reason of the carbonic acid, refrigeration, condensation and to possible lack of control accuracy by reason of turbulence or gas within the tank and variations in demand rate.

It is accordingly a general object of the present invention to provide a new and improved liquid level float switch apparatus which eliminates problems encountered with the above difficulties.

It is another object of the present invention to provide apparatus of the foregoing character especially suitable for utilization in connection with carbonators in beverage vending machines.

It is a related object of the present invention to provide such apparatus which is practical and economical of manufacture.

A further object resides in the complete isolation of all liquid level control elements from contact or penetration by moisture and carbonated water.

The invention is further characterized by a slim line level control of excellent accuracy which can be installed as a waterproof unit by insertion through a narrow threaded pipe opening.

In accordance with the present invention, a liquid level float switch apparatus includes an elongated cylindrical housing of less than one inch diameter which embodies a plurality of electrical components constituting an electric motor control circuit completely waterproofed, enclosed protectively within the carbonator tank that functions as a unit that can be completely tested before installation.

As illustrated, the circuit controls the actuation of a motor which governs the injection of the liquid into a carbonator tank. A hollow sleeve projects inwardly from one end of the tank, and disposed within that sleeve is a magnetic-field operated switch having armature and stator contact members wherein the armature is movable to closed position by application of a magnetic field thereto and opens when the field is removed. The switch is coupled to a circuit having solid state components encapsulated in wax for energizing the motor when the contact members are closed. A free-floating ceramic permanent magnet assembly is disposed slidably on the sleeve and is movable between a position at which the flux of the magnet actuates the contact members and a position at which the contact members are freed from the flux field of the magnet to open the magnets.

Accordingly, another important object of the invention is to provide a switch arrangement in which following closure there is a substantial time delay before opening.

Other objects, advantages and features of the invention will appear in the following description when read in the light of the accompanying drawings in which like reference numerals identify like elements.

In these drawings:

FIG. 1 is a side elevational view, partially broken away, of a carbonator tank incorporating an embodiment of the present invention;

FIG. 2 is an enlarged longitudinal cross-sectional view of a portion of the apparatus in FIG. 1, showing the elements in non-actuating positions;

FIG. 3 is an enlarged, partially fragmentary view of a portion of FIG. 2 with the switch and elements shown in the switch actuated position.

Figure 4:
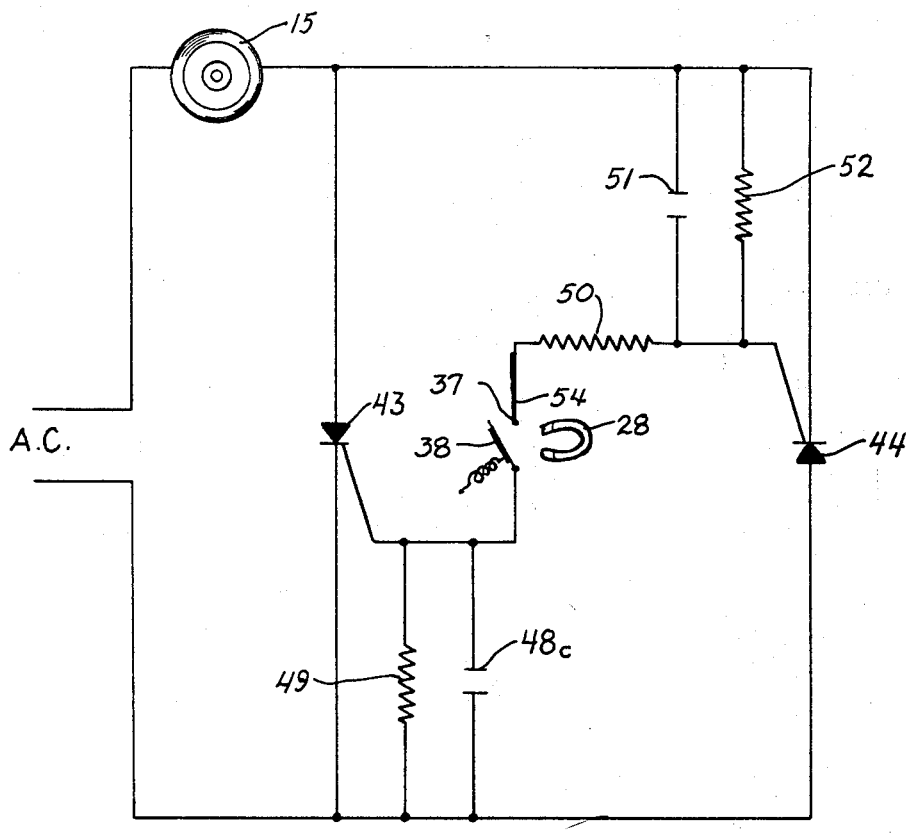
FIG. 4 is a schematic diagram of circuitry utilized in connection with the apparatus of FIGS. 1–3.

As shown in FIG. 1 for purposes of illustrating the present invention, a carbonator tank 10 is of generally cylindrical shape and contains a body 11 of carbonated water. Projecting downwardly into a tank 10 from the tank head 10h in hermetically sealed relationship with respect thereto is a liquid level float switch control 12. Externally of tank 10, the control 12 terminates in a conduit elbow 13 from which extend a pair of hermetically sealed leads 14 coupled to an electric motor 15 discussed in more detail below with respect to FIG. 4. Tank 10 also includes an inlet 16 for water, an inlet 17 for carbon dioxide gas, and an outlet 18 for carbonated water, all hermetically sealed in the top head of the tank.

In more detail, the float switch is composed of an elongated cylindrical shell or housing 20 preferably constructed of an elastomer or molded nylon impervious to carbonated water. At its upper end, the housing 20 is secured in an adapter 21 and is further hermetically sealed thereto by means of an O-ring 22 pressed between an inner groove in adapter 21 and the external surface of housing 20. Adapter 21 preferably is of stainless steel and in turn is threaded into a collar 23 welded around the edges of an annular opening in the head 10h of tank 10. An elastomer washer 24 hermetically seals the adapter 21 to collar 23.

Projecting downwardly and further within tank 10 from housing 20 is a stainless-steel sleeve 26 hermetically sealed to the lower end portion of housing 20. For this purpose, the sleeve 26 near its upper end is crimped to provide an annular flange 26f which seats within a groove or recess formed in the mouth at the lower end of housing 20 where it is sealed preferably by another O-ring 22r on its upper face and secured by a bead of thermally set compound fused to the housing 20 on its lower face.

Slidably disposed for vertical movement upon sleeve 26 is a cylindrical permanent magnet assembly 27 composed of a hollow float 30 and an annular ceramic magnet 28 polarized axially of sleeve 26 and seated within a recess defined in the upper end of the nylon float 30. Float 30 is formed to define a pair of cylindrical air chambers 31 and 32, increasing the buoyancy of the magnet assembly within water 11. Near the lower end of sleeve 26 is a stop 34 which as illustrated is simply a speed nut screwed over that end of the sleeve.

Disposed within sleeve 26 near its lower end is a reed-type normally open switch 35 having armature and stator contact members 37 and 38 of magnetic material. Armature 37 is movable radially of sleeve 26 in response to the magnetic field oriented parallel to sleeve 26.

In this instance, the lower end of sleeve 26 is closed by a plug 40, also preferably of stainless steel, and sleeve 26 is lined with a tube of electrically insulating material 41 through which a pair of leads extend from the switch upwardly into the housing 20.

Located within housing 20 are a plurality of electrical components which together constitute an electric control circuit for motor 15. These components include a pair of silicon-controlled rectifiers 43 and 44 the conventional mounting studs of which are seated but spaced electrically apart in an electrically insulating tube 45. Tube 45 in turn is supported within housing 20 by a wax potting compound 46. Silicon-controlled rectifier 43 is also supported from the upper end of another insulating tube 47, the lower end of which is affixed to an insulating plug which in turn is affixed to the upper end of liner 41 extending out of sleeve 26. Supported within tube 47 and from the leads of rectifier 43 is a capacitor 48c and a bias resistor 49 as well as a balancing resistor 50. Potted within compound 46 and affixed to the leads of rectifier 44 is another capacitor 51 and a bias resistor 52.

As indicated in FIG. 2, the potting compound impregnates the entire space surrounding the silicon-controlled rectifier assembly and also surrounding tube 47, and serves as a heat sink material discharging heat through the wall of housing 20 into refrigerated space in the tank 10. Individual wire leads interconnect the various components into the circuit illustrated in FIG. 4. With reference to the latter figure, it may be observed that an alternating-current energization circuit extends from one side of the A.C. lines through motor 15 and through the parallel network of rectifiers 43 and 44 back to the other side of the A.C. line. Resistors 49, 50 and 52, when completed in series circuit by switch 35, create a voltage divider which establishes at the gate electrodes of each of the rectifiers a potential "firing" the two rectifiers which thereupon conduct half in alternate half cycles to energize the motor.

With a sufficient quantity of carbonated water contained within tank 10, magnet assembly 27 is buoyed upwardly and the field from magnet 28 is ultimately withdrawn from actuatable influence upon switch 35. After withdrawal of a quantity of the liquid by way of outlet 18, the water level is lowered as a result of which magnet 28 is closer to switch 35. When magnet 28 becomes closely adjacent to or aligned with switch 35, the magnet field effects radial movement of armature 37 and its consequent closure with stator contact member 38. Such closure completes the voltage divider firing circuit for rectifiers 43, 44, thereby energizing motor 15. Stop 34 in this case limits the downward movement of magnet 28 to a position just below the position where the magnet actuates switch 35. The motor 15 responds in a manner conventional per se, to drive a pump and supply additional water and carbonizing gas to inlets 16 and 17. Introduction of the additional liquid for carbonation continues until the increased water level within tank 10 moves magnet 28 sufficiently upward and out of actuating influence upon switch 35 that contacting members 37 and 38 open and thereby cause the de-energization of motor 15.

In this connection, it is important to note that an elongated ferrous magnetically responsive metal element is employed as upper lead 54 and this extends upwardly and preferably through the magnet 28 so that the decreasing magnetic flux occurring with a buoyantly rising magnet is prolonged at switch 35 for a substantial distance or time. Accordingly, in operation, since a magnetic force varies as an inverse function of the distance, the magnet can move an incremental distance to a first position toward the armature 37 before switch 35 closes. With switch blades contacting, the effective magnetic force required to maintain closure can be weakened a great deal before an opening will occur. The weakening of the effective magnetic force is further delayed by one of the contacts effectively remaining under the influence of the magnet for a time or continuously. As the magnet approaches a second position near the free end of the lead 54 separated from the first position, the closed magnetic flux paths of the magnet move upwardly along the ferrous lead 54 until the end becomes polarized with a high density of magnetic flux whereupon the flux density at the other end rapidly decreases to a level below that required for holding the switch closed and the switch opens. This relates the response to an effect which can be termed a time or level delay or latching effect and can be varied either by varying the gap with respect to a predetermined magnetic flux constant or by varying the flux constant itself by electro magnetic current changes.

One modification of the disclosed apparatus housing 20 comprises the stainless steel tube 26 engaging the rectifiers as heat sinks for the silicon-controlled rectifiers, but it has been found that the wax potting is sufficient to couple the housing to the rectifiers 43 and 44 so that it serves as a heat sink for the rectifiers. In any case, it is advantageous to cause the water incoming through inlet 16 to spray upon or run down the outside of housing 20 so as to effect cooling thereof during the very time in which the rectifiers are energized. Consequently, the dissipation rating of the latter may be significantly increased.

In another modification, provision is made for elongating the magnetic flux path in order to enable closure of switch 35 over a greater range of water level. To this end, the ceramic magnet material as shown is somewhat elongated in the axial direction in order to provide a substantial length of flux pattern effective over a substantial length of the float 30. Additionally or alternatively, magnetic couplers may be included to conduct the flux from magnet 28 over a greater length of the overall float assembly.

While the ceramic magnet here employed produces a field generally of less strength than that of a corresponding alnico magnet or the like, the specific cylindrical shape and axial polarization of magnet 28 enables effective operation of the reed switch 35. At the same time, the ceramic material is many times lighter than a metallic magnet of corresponding strength. In consequence, ceramic magnet 28 produces an adequate field strength while yet being of a size sufficiently small to be floatable and substantially immune to false movements arising out of turbulence or gas movement in the carbonator tank. Moreover, inasmuch as magnet 28 is adequate to actuate reed switch 35 without the need for magnification of movement as by a lever, the assembly is receivable through the very small opening provided by collar 23 and is readily available both with respect to assembly and to service. Of significant practical interest, none of the parts exposed to the carbonated water, including particularly the ceramic magnet itself, deteriorate in the presence of that particular liquid. In consequence, the overall assembly is ideally suited for long periods of trouble-free operation.

In use, ceramic magnet 28 and its assembly are entirely free floating. Being free of magnetic cooperation with any structure other than switch 35 and associated ferrous elements, magnetic asembly 27 exhibits a substantially constant buoyancy throughout its range of movement, thereby lending itself to constant and predictable response control.

What is claimed is:
1. Liquid level float switch apparatus comprising:
   a tank;
   means for introducing carbon dioxide into said tank;

means including a motor for pumping water into said tank;

means for withdrawing carbonated water from said tank;

an elongated cylindrical housing projecting into said tank;

a plurality of electrical components, constituting a control circuit for said motor, disposed in said housing;

a hollow sleeve projecting from one end of said housing further within said tank;

a magnetic-field-operable switch disposed in said sleeve and having armature and stator contact members with said armature being actuatable in response to a magnetic field, an electricity conducting magnetically responsive elongated ferrous metal lead extending from one of said contact members through said sleeve to the lower end of said housing for coupling said switch to said circuit for effecting energization of said motor upon actuation of said contact members; and a float slidably mounted on said sleeve below said housing;

a ceramic permanent magnet assembly disposed on said float and movable therewith along said lead between a position at which said magnet effects actuation of said contact members through said lead and another position at which said contact members are actually free of magnetic flux from said magnet.

2. Liquid level float switch apparatus comprising:
a tank;
means for forming carbonated water within said tank;
an elongated cylindrical housing, of electrically insulating material, projecting within said tank;
a plurality of electrical components, constituting an electric motor control circuit, disposed in said housing;
a hollow sleeve projecting from one end of said housing further within said tank;
a normally open reed-type switch disposed in said sleeve and having armature and stator contact members of magnetic material with said armature being movable radially of said sleeve;
an elongated magnetically responsive lead of ferrous metal extending through said hollow sleeve to said one end of the housing and coupling one of said contact members to said circuit for effecting motor energization upon closure of said contact members; and
a float slidably mounted on said sleeve below said housing;
an annular axially polarized ceramic permanent magnet assembly disposed on said float and movable therewith along said magnetically responsive lead between a position at which said magnet is adjacent to said one of said contacts and effects closure of said contact members and a position remote from said one of said contacts where said control members are actuatably free of the field from said magnet.

3. Liquid level float switch apparatus comprising:
a tank;
means for forming carbonated water in said tank;
an elongated cylindrical housing projecting within said tank and housing enclosed electrically controlled components;

a hollow sleeve projecting further within said tank from one end of said housing;

a magnetic-field-operable electrical circuit control switch disposed in said sleeve and having armature and stator contact members of magnetic material with said armature being magnetically movable radially of said sleeve for effecting energization of said circuit upon closure of said contact members;

an electricity conducting magnetically responsive elongated ferrous metal lead connected to one of said contact members and extending through said sleeve to a point remote from said switch at said one end of said housing and connected to one of said components; and a float slidably mounted on said sleeve below said housing;

an annular axially polarized ceramic permanent magnet assembly on said float and movable upon said sleeve along said lead between one position at which said magnet is adjacent to said one of said contacts and effects through said lead closure of said contact members and another position remote from said one of said contacts at which said one of said contact members is actuatably free of magnetic flux from said magnet.

4. Apparatus as defined in claim 3 in which a stop is mounted upon said sleeve in a position limiting movement of said permanent magnet assembly, in a direction toward that at which closure of said contact members is effected, to the position at which said closure is effected.

5. Liquid level float switch apparatus comprising:
a tank;
means for forming carbonated water in said tank;
an elongated cylindrical housing composed of an electrically insulating material projecting within said tank;
a hollow sleeve of stainless steel projecting further within said tank from one end of said housing;
a magnetic-field-operable switch disposed in said sleeve and having armature and stator contact members of magnetic material with said armature being movable radially of said sleeve in response to a magnetic field oriented parallel thereto and with said switch being coupled to a circuit for effecting energization of said circuit upon closure of said contact members;
a float slidably mounted on said sleeve;
an annular axially polarized ceramic permanent magnet assembly on said float and movable therewith upon said sleeve between one position at which said magnet is adjacent to and effects closure of said contact members and another position in which said contact members are actuatably free of the field from said magnet; and
an electrically insulating liner disposed within said sleeve between the latter and said switch.

References Cited
UNITED STATES PATENTS

| | | | |
|---|---|---|---|
| 2,337,783 | 12/1943 | Thompson et al. | |
| 3,053,770 | 9/1962 | Counts | 252—62.5 |
| 3,200,645 | 8/1965 | Levins | 200—84 X |
| 3,204,230 | 8/1965 | Hosford | 200—84 X |
| 3,249,714 | 5/1966 | Hyink et al. | 335—205 X |

RONALD R. WEAVER, *Primary Examiner.*